Patented Apr. 9, 1935

1,996,959

UNITED STATES PATENT OFFICE 1,996,959

1-AROYLAMINO-6-AMINO-ANTHRA-QUINONE AND ITS PREPARATION

Donald P. Graham, South Milwaukee, Wis., assignor to E. I. du Pont de Nemours & Company, Wilmington, Del., a corporation of Delaware No Drawing. Application October 28, 1933, Serial No. 695,663

7 Claims. (Cl. 260—60)

This invention relates to 1-aroylamino-6-amino-anthraquinone and the process of making the same.

Although it is known that alpha, alpha-diamino-anthraquinones may be benzoylated to produce dibenzoylamino-anthraquinones and mono-benzoyl-diamino-anthraquinones, it was not to be expected that 1,6-diamino-anthraquinone could be mono-acidylated to produce a high yield of 1-acidylamino-6-amino-anthraquinone, free of substantial amounts of the di-acidylamino- and the 6-acidylamino-1-amino-anthraquinones.

In general, my invention resides in the preparation of these new 1-acidylamino-6-amino-anthraquinones by reacting upon a 1,6-diamino-anthraquinone with acid chlorides or acid anhydrides under conditions leading to the acidylation of only the alpha-amino group. Temperatures of from about 100° to about 210° C. have been found applicable for carrying out this reaction, using substantially molecular quantities of the two reacting compounds.

The particular procedure used in preparing these new compounds is illustrated by the following examples, which, it is of course understood, are not to be construed in any respect as limitations upon my invention. In these examples parts by weight are given.

Example 1

1 part of 1,6-diamino-anthraquinone is slurried in 10 parts of nitrobenzene at 140° C. At this temperature, 0.6 parts of benzoyl chloride mixed with 2 parts of nitro-benzene are added during 4 hours. The charge is then cooled to 90° and drowned in 10 parts of alcohol at 75°. It is filtered at 55°. The residue includes some di-benzoyl-1,6-diamino-anthraquinone. The filtrate carries the 1-benzoyl-amino-6-amino-anthraquinone, which is isolated by chilling the filtrate to below 5° C. for 4 hours and filtering at this temperature. The cake is washed with alcohol and dried. The product is a brownish yellow powder giving a red orange vat and a brownish red solution in sulphuric acid.

Example 2

1 part of 1,6-diamino-anthraquinone is dissolved in 10 parts of nitrobenzene and 1 part of pyridine. 0.63 parts of benzoyl chloride mixed with 1 part of nitrobenzene are added during 1 hour at 140–170° C. The charge is held at 165–170° for 15 minutes, cooled to 65° C. and filtered. The filtrate containing the 1-benzoylamino-6-amino-anthraquinone is cooled to below 5° C. and filtered. The product is washed with alcohol and dried.

Example 3

1 part of 1,6-diamino-anthraquinone is dissolved in 12 parts of nitrobenzene. 0.4 parts of soda ash are added and the charge heated to 140–150° C. 0.63 parts of benzoyl chloride mixed with 1 part of nitrobenzene are added during 2 hours at the above temperature. The product, 1-benzoyl-amino-6-amino-anthraquinone is isolated as in Example 1.

Example 4

1 part of 1,6-diamino-anthraquinone is dissolved in 9 parts of nitrobenzene with 0.45 parts of soda ash and 1.1 part of pyridine. 0.68 parts of benzoyl chloride mixed with 1 part of nitrobenzene are added at 120–160° C. during 1–2 hours. The charge is held at 160–170° for 1 hour, cooled to 90°, and the product isolated as in Example 1.

Example 5

1 part of 1,6-diamino-anthraquinone is slurried in 9 parts of nitrobenzene with 1.1 parts of benzoic anhydride and heated during 1 or 2 hours to 145°. It is held at 135–145° for 1 hour, cooled to 80° C., and drowned in 9–10 parts of alcohol at 75° C. The product is isolated as in Example 1.

Example 6

1 part of 1,6-diamino-anthraquinone is dissolved in 15 parts of nitrobenzene and heated to 200°. At 200–210°, 1.3 parts of 1-chloro-anthraquinone-2-carbonyl chloride are added during about ½ hour. The charge is cooled and the product isolated by filtration, washed, and dried.

Example 7

1 part of 1,6-diamino-anthraquinone is dissolved in 12 parts of nitrobenzene and 1.4 parts of pyridine and heated to 120°. 1 part of beta-chloro-naphthoyl chloride in 3 parts of nitrobenzene is added at 120–160° during 1 hour. The charge is held ½ hour at 160–165°, cooled to 100°, and filtered. The product is isolated from the filtrate by dilution with alcohol, cooling and refiltration; washed with alcohol, and dried.

The scope of the invention is not limited to the examples above given but is intended to include the preparation of alpha-acidylamino-compounds of 1,6-diamino-anthraquinone generally. Other acid binding agents than the soda ash and pyridine may be used, as will be obvious to those skilled in the art, and any inert organic solvent which is suitable for use at the temperature under which the reaction is to be carried out may be substituted for the nitrobenzene, such as dichlorobenzene or trichlorobenzene.

While the use of an acid binding agent is not always necessary, its use is desirable, at the lower temperatures, for in the acidylation using acid chlorides, there is a tendency for the hydrochloric acid liberated to add to the unoccupied alpha-amino group, blocking acidylation in that position and forcing the acid chloride to react with the beta-amino groups. Another method for overcoming this difficulty is to add the acid chloride over a period of time sufficiently long to permit the hydrochloric acid to pass off as formed. Of course when the acid anhydride is used, no hydrogen chloride is liberated and consequently no acid binding agent need be employed.

Having now particularly described my invention, what I claim is:

1. A 1-aroylamino-6-amino-anthraquinone.
2. A 1-benzoylamino-6-amino-anthraquinone.
3. A 1-anthraquinonoylamino-6-amino-anthraquinone.
4. In the process for mono-aroylating 1,6-diamino-anthraquinone, the step which comprises heating it with a substantially molecular proportion of an aroylating agent.
5. In the process for mono-aroylating 1,6-diamino-anthraquinone, the step which comprises heating it with a substantially molecular proportion of an aroylating agent at temperatures of from about 100° C. to about 210° C.
6. In the process for preparing 1-benzoylamino-6-amino-anthraquinone, the step which comprises heating 1,6-diamino-anthraquinone in an inert solvent with substantially molecular proportions of benzoyl chloride at 120 to 170° C. in the presence of an acid binding agent.
7. In the process for preparing 1-benzoylamino-6-amino-anthraquinone, the step which comprises heating 1,6-diamino-anthraquinone in an inert solvent with substantially molecular proportions of benzoic anhydride at 120 to 170° C.

DONALD P. GRAHAM.